No. 679,313. Patented July 30, 1901.
W. F. HEMBREY.
VEHICLE HUB.
(Application filed Jan. 12, 1901.)

(No Model.)

Witnesses
Geo. Ackman
F. W. Riley

Inventor
W. F. Hembrey
By Victor J. Evans
Attorney

UNITED STATES PATENT OFFICE.

WILLIAM FINIS HEMBREY, OF HUTCHINSON, ARKANSAS, ASSIGNOR OF ONE-HALF TO TYE LAWSON AND THOMAS KEEN, OF SAME PLACE.

VEHICLE-HUB.

SPECIFICATION forming part of Letters Patent No. 679,313, dated July 30, 1901

Application filed January 12, 1901. Serial No. 43,026. (No model.)

*To all whom it may concern:*

Be it known that I, WILLIAM FINIS HEMBREY, a citizen of the United States, residing at Hutchinson, in the county of Independence and State of Arkansas, have invented new and useful Improvements in Vehicle-Hubs, of which the following is a specification.

My invention relates to vehicle-hubs; and its object is to provide a hub comprising movable sections between which the inner ends of the wheel-spokes may be securely clamped and which may be readily adjusted laterally to accommodate spokes of different widths and to obviate the necessity of forming tenons on the inner ends of the spokes, and thereby strengthen the spokes at this point.

The invention includes novel details of construction, which will be fully described hereinafter in connection with the accompanying drawings, which form a part of this specification, and particularly pointed out in the appended claim.

Figure 1:
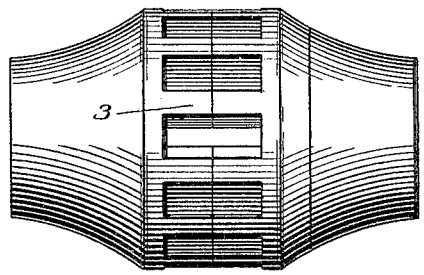
Figure 2:
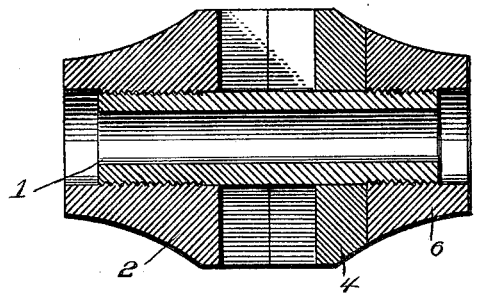
Figure 3:
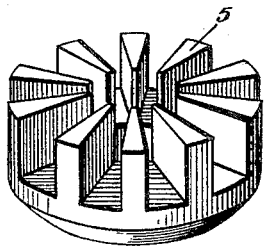

In the drawings, Figure 1 is an elevation of a wheel-hub embodying the invention. Fig. 2 is a central longitudinal section of the same; and Fig. 3 is a view in perspective of one of the sections of the hub, showing the inner side thereof.

The reference-numeral 1 designates a sleeve, which is externally threaded for a proper distance at both ends.

2 designates one of the hub-sections, which is internally threaded for a portion of its length to adapt it to be screwed upon one end of the sleeve 1. The hub-section 2 is of tapering or conical shape on its outer surface, and its inner end is formed with a series of equidistant radially-disposed lugs 3, which are graduated in thickness from their outer to their inner ends. 4 designates the other hub-section, formed with a central unthreaded opening, through which the sleeve 1 extends, and having on its inner face a series of radial lugs 5, corresponding in shape and number to the lugs 3 of the hub-section 2.

6 designates a nut adapted to be screwed onto the end of the sleeve 1 which projects beyond the hub-section 4 and which is tapered to form a continuation of the outer surface of the hub-section 4, as is clearly shown in Figs. 1 and 2.

The utility and operation of the construction above described will be readily understood. By loosening the nut 6 the hub-section 4 may be adjusted laterally with relation to the section 2 to permit a spoke to be removed without removing the tire or rim of the wheel, and the spokes may be readily tightened by turning the nut 6 or the hub-section 2.

An important advantage of my improved construction is that it is not necessary to form tenons on the inner ends of the spokes, as the spaces between the lugs on the hub-sections are of a size to receive the full width of the spokes, and thus the necessity of weakening the spokes at their inner ends by recessing them to form tenons is entirely avoided and the wheel is greatly strengthened.

As the hub-sections will secure spokes of any width, a very strong wheel may be constructed upon a comparatively small hub.

A further advantage of the improvement is that the sleeve 1, which constitutes the bearing, may be readily replaced when worn.

It will be perceived that the construction of the hub is of the simplest, consisting of but four elements immediately and positively held together by a single sleeve.

I claim—

A vehicle-hub comprising a central sleeve formed with external screw-threads extending for a distance at both ends, a hub-section internally threaded to engage directly with the threads of the sleeve and formed with a plurality of radial spoke-lugs on its inner face, a second hub-section 4, having a smooth central aperture to fit movably directly over the unthreaded portion of the sleeve and formed with a plurality of spoke-lugs on its inner face, and a tapering fastening-nut, constituting an extension of the hub, mounted directly on the end of the sleeve which projects from the hub-section 4, substantially as described.

In testimony whereof I affix my signature in presence of two witnesses.

WILLIAM FINIS HEMBREY.

Witnesses:
R. W. WALLAY,
JAMES BLAUNT.